United States Patent [19]

Volk

[11] Patent Number: 5,533,900
[45] Date of Patent: Jul. 9, 1996

[54] STENCIL HOLDER AND KIT AND METHOD OF MAKING AN IMAGE

[75] Inventor: Robert S. Volk, Easton, Pa.

[73] Assignee: Binney & Smith Inc., Easton, Pa.

[21] Appl. No.: 165,721

[22] Filed: Dec. 13, 1993

[51] Int. Cl.$^6$ .................................................. G09B 11/04
[52] U.S. Cl. .............................................. 434/87; 434/408
[58] Field of Search .................................. 434/87, 88, 85, 434/408, 415, 425, 164, 155

[56] References Cited

U.S. PATENT DOCUMENTS

| | | | |
|---|---|---|---|
| D. 120,652 | 5/1940 | Posnack . | |
| D. 171,865 | 3/1954 | Roth | D74/1 |
| D. 287,862 | 1/1987 | Hauser et al. | D19/78 |
| D. 288,826 | 3/1987 | Johansson | D19/78 |
| D. 293,453 | 12/1987 | Johanson | D19/77 |
| D. 330,045 | 10/1992 | Dietterich et al. | D19/36 |
| D. 332,468 | 1/1993 | Tarozzi | D19/85 |
| D. 334,946 | 4/1993 | Tarozzi | D19/77 |
| D. 338,496 | 8/1993 | Tarozzi | D19/85 |
| 1,228,163 | 5/1917 | Arents . | |
| 1,821,369 | 9/1931 | Wetterstrand . | |
| 3,528,183 | 9/1970 | Lucero | 434/164 |
| 3,633,286 | 1/1972 | Maurer . | |
| 3,731,402 | 5/1973 | Paul | 434/164 |
| 3,740,872 | 6/1973 | Mayo | 434/164 |
| 3,861,066 | 1/1975 | Klaja . | |
| 4,470,197 | 9/1984 | Pagalies | 434/87 X |
| 4,604,062 | 8/1986 | Woods | 434/88 |
| 4,807,538 | 2/1989 | Hoffman | 108/25 |
| 4,836,783 | 6/1989 | Harper | 434/87 |
| 4,931,017 | 6/1990 | Mann | 434/87 |
| 4,960,382 | 10/1990 | Alford | 434/164 |
| 4,972,598 | 11/1990 | Charters, Jr. | 33/564 |
| 5,100,324 | 3/1992 | Slayton | 434/87 |
| 5,141,438 | 8/1992 | Spector | 434/87 |
| 5,163,846 | 11/1992 | Lee | 434/408 |
| 5,190,151 | 3/1993 | Dietterich | 206/214 |
| 5,203,702 | 4/1993 | Wilson | 434/857 |
| 5,203,706 | 4/1993 | Zamir | 434/172 |
| 5,228,858 | 7/1993 | Fromm | 434/84 |
| 5,248,030 | 9/1993 | Tarozzi | 206/1.7 |

OTHER PUBLICATIONS

Crayola® Draw 'N' Do Desk —Color Photocopy of Binney & Smith Inc. 1984 Catalog, p. 26.
Crayola® Designer Kit —Color Photocopy of Binney & Smith Inc. 1984 Catalog, p. 27.
Crayola® Dabber Doo —Color Photocopy of Binney & Smith Inc. 1984 Catalog, p. 30.
Crayola® Create–A–Critter —Color Photocopy of Binney & Smith Inc. 1992 Catalog, one page.
Crayola® Draw 'N' Do Desk —Color Photocopy of Binney & Smith Inc. 1992 Catalog, one page.
Crayola® Stencil Art Kit —Color Photocopy of Binney & Smith Inc. 1993 Catalog, one page.

*Primary Examiner*—Gene Mencene
*Assistant Examiner*—Jeffrey A. Smith
*Attorney, Agent, or Firm*—Leydig, Voit & Mayer, Ltd.

[57] ABSTRACT

A stencil set comprises a platform and a covering tab for detachably mounting at least one, and preferably four, stencils in a fixed position with respect to the platform and a writing surface. The stencil set allows the user to create more than one image on the writing surface, without the need to adjust the stencils or the writing surface. In one aspect of the invention, storage is provided for the stencils associated with the stencil set. The stencil set of the present invention is suitable for use by young children.

84 Claims, 3 Drawing Sheets

STENCIL HOLDER AND KIT AND METHOD OF MAKING AN IMAGE

FIELD OF THE INVENTION

The present invention relates to a stencil holder and set. Specifically, the invention pertains to a stencil set that allows the user to trace the images from one or more stencils onto a writing surface without adjusting the writing surface, holds the stencil in a fixed position with respect to the writing surface while the user is making a stencil tracing, and provides for storage and display of the stencils. In particular, the stencil set is suitably for use by a young child. The present invention also relates to a method of making a tracing on a marking surface.

BACKGROUND OF THE INVENTION

Many people are known to enjoy drawing, sketching, and doodling. In particular, young children are known to be fond of doodling, painting, and drawing pictures. Allowing a young child to draw has several benefits. First, drawing may provide an outlet for the child to be creative and imaginative. Second, young children are extremely active. When a child is given writing materials, the child may be occupied for several hours. Such activity is safe, inexpensive, and does not require keen attention of a supervising adult. Third, when presented with an image to reproduce, the child's curiosity is piqued, and the child becomes inquisitive of the subject matter drawn. For example, if a child is presented with an image of an airplane to draw, color, or trace, the child's mind is turned to the subject of airplanes. This situation may lead the child to ponder the subject of airplanes, the manner in which they fly, how they are constructed, and so forth. Thus, drawing is beneficial for the healthy mental development of the child.

When a very young child, such as a three- or four-year-old, attempts to draw, numerous difficulties are presented. First, young children are not as coordinated as adults, or even older children, and thus they are not able to create drawings as easily as others. Coloring books and similar media have long been known as potential solutions to this problem. However, it is often observed that young children are unable to keep their colorings within the figure boundaries provided. This situation may lead to frustration of the child, which may cause the child to abandon the drawing exercise.

Second, when a young child attempts to draw on a plain writing surface, such as paper, the child often becomes bored. This situation may lead to the child writing on inappropriate surfaces, such as walls and furniture, or may lead the child to abandon the drawing exercise altogether. If the only available activity for the child is drawing, such as, for example, when the child is riding in an automobile during a long trip, this boredom will be significant.

Third, a child often creates considerable clutter when drawing. Often, a supervising adult is forced to spend significant amounts of time cleaning up after a child has finished drawing. Moreover, when the child has drawn or painted on such items as furniture, the child may cause permanent damage to these items.

One potential solution to these problems is to provide the child with a stencil and a writing surface. Stencils, long known to the prior art, are thin sheets of cardboard, metal, or other rigid material cut through in such a way as to reproduce a design or ornament when color is rubbed through them onto an underlying writing surface. *American College Dictionary* 1184 (1957). By using a stencil, one may trace an image onto a writing surface quickly and with great accuracy. Moreover, because stencils are generally created by adults, the image so traced may be fairly complex. Thus, even a very young child may quickly obtain a neat, professionally created image on paper or other writing surface. This situation allows the child to feel a sense of accomplishment, without the child becoming bored or frustrated.

There are numerous drawbacks associated with conventionally known stencils, however. First, a user may only create one image at a time with these stencils; i.e., the user must remove the stencil after only one tracing. In order to create two or more images on a writing surface, the user must (a) place a first stencil onto the writing surface; (b) make a first stencil tracing; (c) remove the stencil; (d) rotate or otherwise adjust the writing surface so that a fresh portion of the surface is provided; (e) place a second stencil to the writing surface; and (f) make a second stencil tracing. These steps present a formidable challenge to a young child.

Second, when making a stencil tracing, the user must hold both the stencil and the writing surface steady, such that the stencil does not move in relation to the surface. If such movement occurs, the resulting tracing will be improper. However, because of the poor physical dexterity of young children, they often cannot hold the stencil and the writing surface firmly. Of course, it has long been known to position a stencil along the border of a straight edge or a T-square. Applying a slight pressure to the stencil will allow the user to prevent the stencil from shifting. Where the user is a young child, however, this may require coordination beyond the child's abilities.

Third, young children are notorious for misplacing their possessions, or leaving them in places where they may be damaged, such as on the floor. This situation is especially likely to occur when the child is given a number of stencils. Often, the child may scatter the stencils about the room, rather than stacking them neatly as an older child or adult would do. This frequently leads to the child losing one or more of the stencils, or leaving them in an inappropriate place.

All of these drawbacks detract from the appeal of providing a young child with a stencil and a writing surface.

OBJECTS OF THE INVENTION

It is therefore an object of the present invention to provide a stencil set that allows a child to trace the images from more than one stencil onto a writing surface without the need to rotate or otherwise adjust the writing surface.

A further object of the present invention is to provide a stencil holder that is capable of holding one or more stencils in a fixed position with respect to the underlying writing surface, so that a child who has not developed a high level of dexterity may make a stencil tracing.

Yet another object of the present invention is to provide a stencil holder that allows for storage of the stencils when the stencils are not in use.

A still further object of the present invention is to provide a stencil holder that allows for display of the stencils that are not mounted to the stencil holder.

Still another object of the present invention is to provide a stencil set that allows a child to make use of crayons, pencils, markers, and chalk when tracing an image.

All of these objects are realized in whole or part by one or more embodiments of the present invention. Other objects, as well as other inventive features of the present invention, will be apparent to one skilled in the art from the specification and appended claims.

SUMMARY OF THE INVENTION

The present invention is a stencil holder which comprises a platform, means for detachably securing one or more stencils in a fixed position with respect to the platform, and, optionally, means for storage and means for display of the stencils associated with the platform. In one aspect of the present invention, the holder comprises means for detachably securing four stencils in a fixed position with respect to the platform, wherein the stencils each have identical exterior dimensions.

Also encompassed by the present invention is a stencil kit that comprises a stencil holder as previously described and two or more stencils adapted to be detachably secured in a fixed position with respect to the stencil holder.

DETAILED DESCRIPTION OF THE PREFERRED EMBODIMENTS

Figure 1:
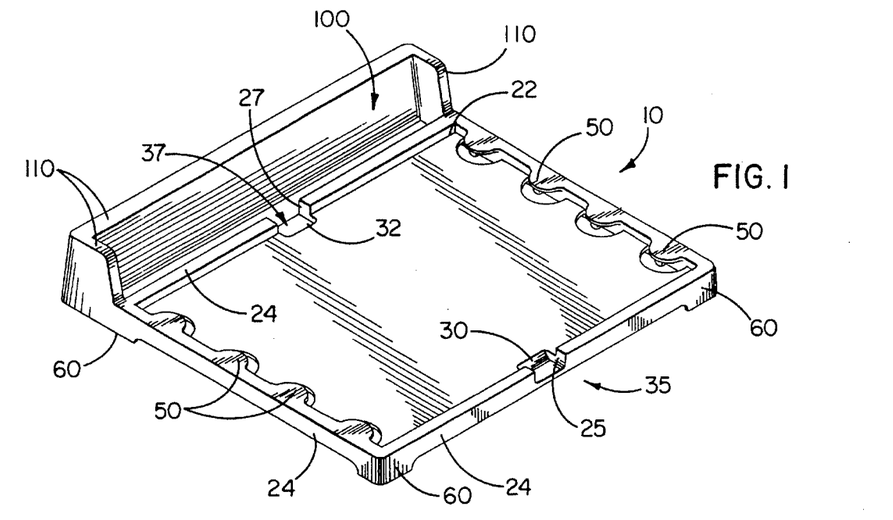
FIG. 1 is a perspective view of the stencil holder without stencils mounted thereto.
Figure 2:
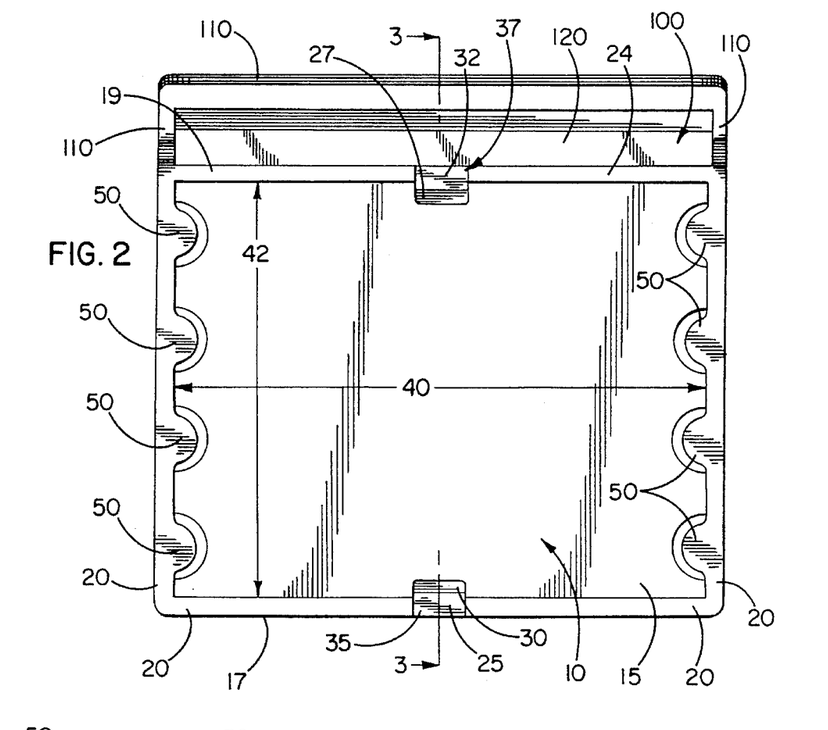
FIG. 2 is a top plan view of the stencil holder without stencils mounted thereto.
Figure 3:
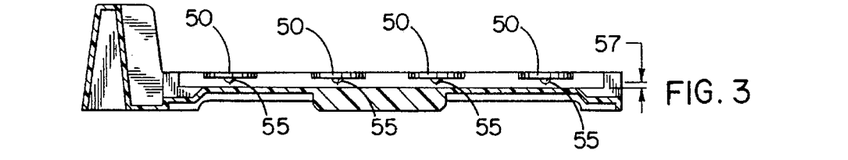
FIG. 3 is a cross-sectional view taken along line 3—3 in FIG. 2.
Figure 5:
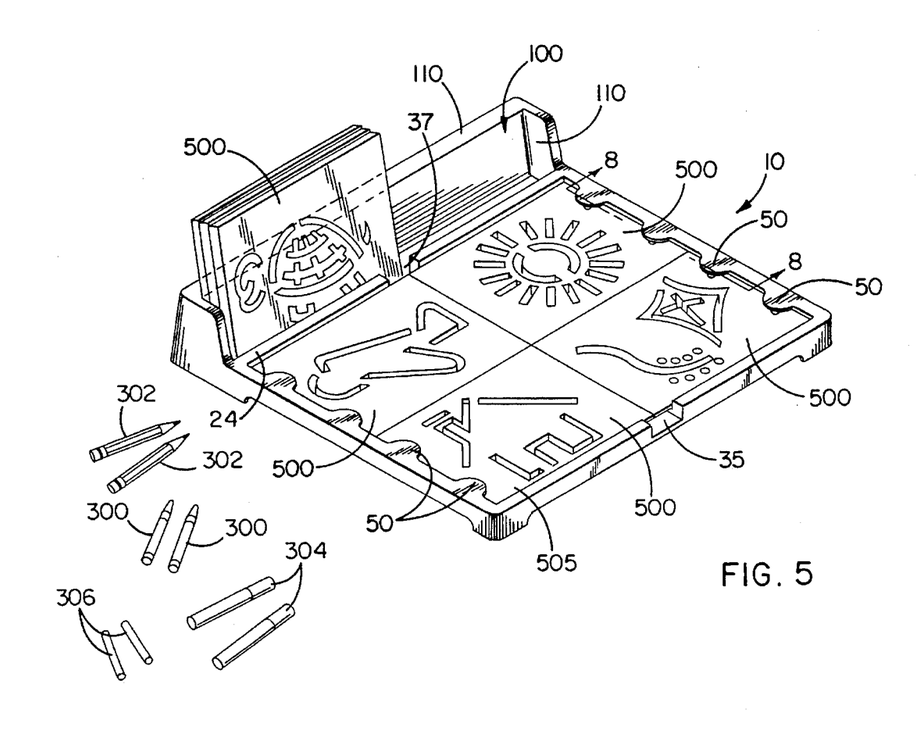
FIG. 5 is a perspective view of the stencil holder with four stencils mounted thereto.

The stencil kit of the present invention comprises a stencil holder and one or more stencils adapted to be detachably secured in a fixed position with respect to the stencil holder. With reference to FIGS. 1, 2, and 5, stencil holder 10 comprises a platform 15 having a proximal end 17 and a distal end 19. The platform includes means for detachably mounting at least one stencil in a fixed position with respect to the platform, such that the stencil is held in a fixed position in relation to an underlying writing surface which is itself secured in a fixed position with respect to the platform. Thus, the stencil is held in a fixed position with respect to the underlying writing surface.

Preferably, the means for mounting the stencil or stencils comprise a retaining wall 20 having an interior surface 22 and an exterior surface 24. Retaining wall 20 extends in a direction generally perpendicular to that of platform 15. Further, retaining wall 20 wholly or partially circumscribes platform 15, onto which one or more stencils 500 may be mounted. Most preferably, the retaining wall 20 wholly circumscribes platform 15 except at first passage 25 and second passage 27, located respectively at proximal end 17 and distal end 19 of platform 15.

In this embodiment, first and second passages 25, 27 are contiguous with proximal notch 30 and distal notch 32 respectively in platform 15. It is thus seen that the alignment of first and second passages 25, 27 with proximal notches 30, 32 produce first lifting slot 35 and second lifting slot 37, respectively. Preferably, the lifting slots are of such dimensions that the user of the stencil set may insert a finger, pencil, or similarly sized object into the lifting slots, thus enabling the user to remove any stencils 500 that are secured to the stencil holder 10. This situation may be observed with reference to FIG. 5.

Stencil holder 10 is preferably adapted to retain four stencils 500, as illustrated in FIG. 5. With reference to FIGS. 2, 5, 6, and 7, one skilled in the art will appreciate that the stencils 500 have a length 502 that is half the length 40 of the platform 15. Similarly, stencils 500 have a width 504 that is half the width 42 of the platform 15. Thus, when four stencils are mounted to the holder, as illustrated in FIG. 5, the edges 505 of stencils 500 engage the interior surface 22 of retaining wall 20, and are held in a fixed position with respect to the platform. The user may remove any of the stencils with the aid of the first or second lifting slots 35, 37 as previously described.

To assist in affixing the stencils 500 to the platform 15, the retaining wall 20 may include one or more covering tabs 50 that extend in a direction generally parallel to platform 15. The construction of the covering tabs 50 is most clearly illustrated by FIGS. 3, 4, 7, and 8. From each covering tab 50 extends a nub 55. The distance 57 between the lowermost portion of nub 55 and the plane of platform 15 is equal to the height 506 of stencil 500. Thus, when a stencil 500 is mounted onto platform 15, one or more nubs 55 engage the top surface of the stencil, as illustrated in FIG. 8. This connection further discourages the stencils from sliding in a direction parallel to the plane of platform 15 when fewer than four stencils are mounted to the platform. Additionally, when covering tabs 50 are included, the stencils 500 are impeded from moving in a direction perpendicular to the plane of platform 15. Thus, when the user accidentally shakes or otherwise jolts the stencil holder 10, the stencils 500 will be inhibited from popping out of the stencil holder. This advantage will be most appreciated when the stencil set is used in an unstable environment, such as in an automobile, plane or train.

The covering tabs 50 may contain means for securing the stencils other than or in addition to nubs 55. For example, the covering tabs 50 may include a chamfered surface. Alternately, the covering tabs 50 and stencils 500 may be imparted with detachably adhesive properties, for example, by way of magnetic surfaces. Nubs are preferred, however, because they may be made of the same material as the stencil holder 10. Further, when nubs are used, the process of molding the stencil holder may be simplified. For example, should the distance 57 require adjustment, the size of the nubs may be easily modified by adjusting the mold. It would be more difficult to adjust the mold when the tabs have another shape, such as a chamfered surface.

Figure 4:
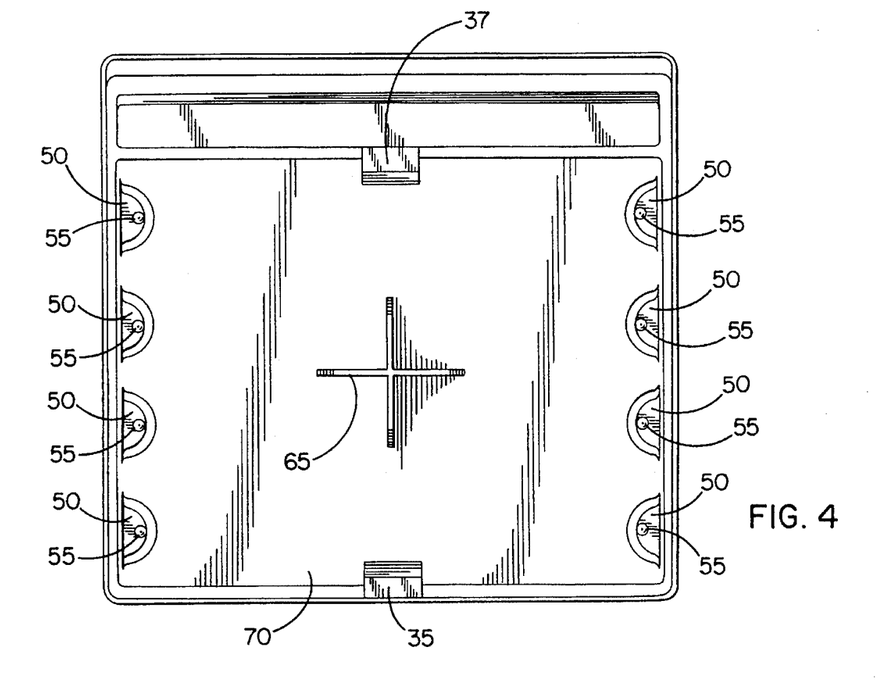
FIG. 4 is a bottom plan view of the stencil holder.

The surface on which the stencil holder 10 is placed may be uneven or irregular. To insure that the stencil holder 10 remains stable, it is desirable to elevate stencil holder 10. Preferably, the platform 15 rests on a skirt 60 which has depending legs at each corner. When the platform rests on an irregular surface, skirt 60 provides support so that platform 15 is stable and does not become deformed. Preferably, a support 65 extends from the lower surface 70 of platform 15, as illustrated by FIG. 4. The support 65 should allow platform 15 to bear a load of approximately 50 pounds, such as the load created when the user presses down upon or stands on platform 15.

In one embodiment of the present invention, the stencil set comprises means for storage of the stencils when the stencils are not in use. Preferably, these storage means allow the user to display the stencils that are not presently mounted to the platform. Thus, the user will be able to select a stencil from some or all of the stencils that are available in the stencil set.

One embodiment of the storage means is a storage well 100, as illustrated in FIGS. 1, 2, 3 and 5. Storage well 100 preferably is located at distal end 19 of platform 15 and is defined by base 120, sides 110, and the exterior surface 24 of retaining wall 20. The storage well 100 should be of such dimensions as to accommodate one or more stencils 500 when the stencils are not mounted to the platform 15. Preferably, the well is of such dimensions as to accommodate as many as sixteen stencils. The shape and location of storage well 100 are not subject to any particular limitation. For example, the well may comprise a box having a cross-section in the shape of a rectangle or other polygon, or that of a cylinder. The storage well may be placed at the distal end 19 of the platform 15, along the sides 110, or in the lower surface 70 of the platform 15. The storage well may comprise a simple pocket or may have a more complex structure, such as a tiered or stepped construction. Preferably, the storage well allows the user to see the stencils that are stored within the storage well, and thus serves as a display means for the stencils.

As previously discussed, the underlying writing surface is itself secured in a fixed position with respect to the platform. In one aspect of the present invention, the platform 15 itself is a suitable writing surface. For example, the platform may be a chalkboard. Chalkboards were traditionally made of slate, but today are more commonly green or black composite boards. If the writing surface is a chalkboard, chalk is used to make a stencil tracing. White or yellow chalk is the most commonly used chalk, although colored chalks are also known.

Alternately, the writing surface may be a whiteboard, which may comprise a melamine, porcelain, or enamel resin layer affixed to a substrate, or may comprise a sheet of polymeric film such as an acrylic or UV curable resin. Suitable polymeric materials include polyethylenes, polypropylenes, polyvinyl chlorides, polyesters, polyethers, polyvinylacetates, polystyrenes, cellulosics such as ethyl cellulose and cellulose acetates, and the like. As a marking instrument for use on either type of whiteboard, whiteboard markers are commonly used.

Another example of a suitable writing surface is a wipeable crayon surface. Such surfaces typically comprise a thin film of smooth material such as polyvinylchloride. These surfaces may be written on with Crayons, and may be easily erased with a material such as a cloth.

In a second aspect of the present invention, the writing surface is a piece or sheet of paper. The paper is secured to the platform 15 by friction. Preferably, the paper has dimensions equal to the dimensions of the platform 15, i.e., a length 40 and a width 42. If the paper has such dimensions, the retaining wall 20 will further prevent the paper from moving in relation to the platform 15. This second embodiment is preferred, because the stencil holder may be more easily made when the writing surface is to be secured to the platform by the user. In the preferred embodiment, the length 40 is approximately 11 inches and the width 42 is approximately 8½ inches. FIG. 8 illustrates the piece of paper 75 secured to platform 15 underneath stencil 500.

When the writing surface is a piece of paper, any known methods for imparting a mark to paper may be employed in using the stencil set. For example, crayons 300, pencils 302, paints, markers 304, chalk 306, and similar marking instruments may be employed. Crayons are available in a great variety of pleasing colors, and have been found to be suitable marking instruments.

Figure 6:
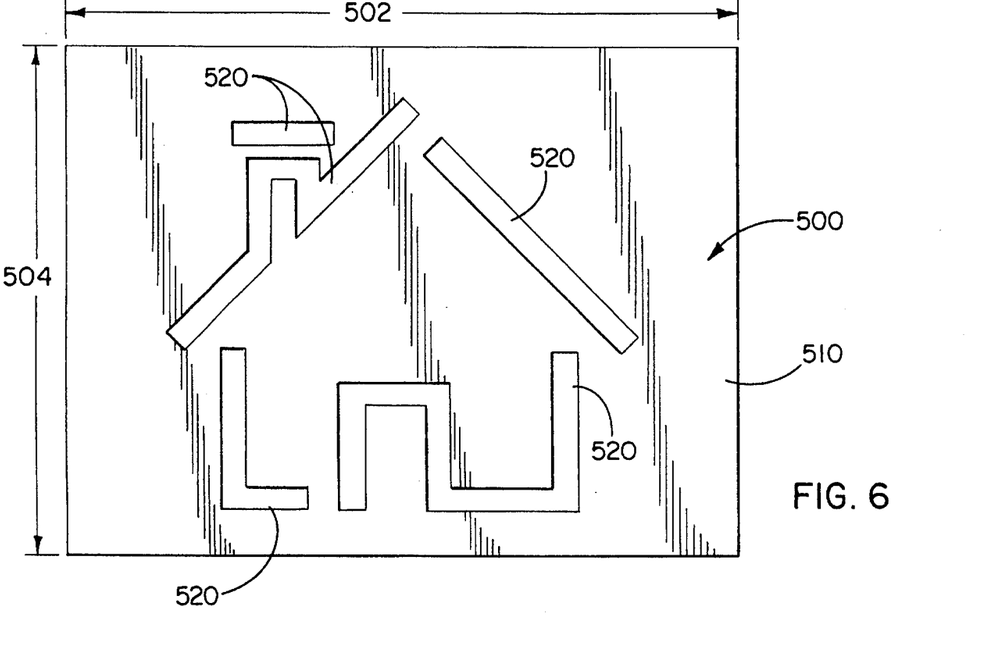
FIG. 6 is a top plan view of a stencil that, along with the stencil holder, forms part of the stencil kit.
Figure 7:
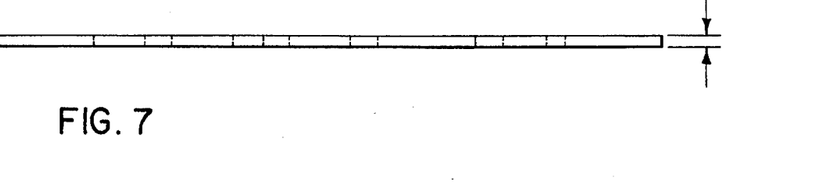
FIG. 7 is a side plan view of the stencil illustrated in FIG. 6.
Figure 8:
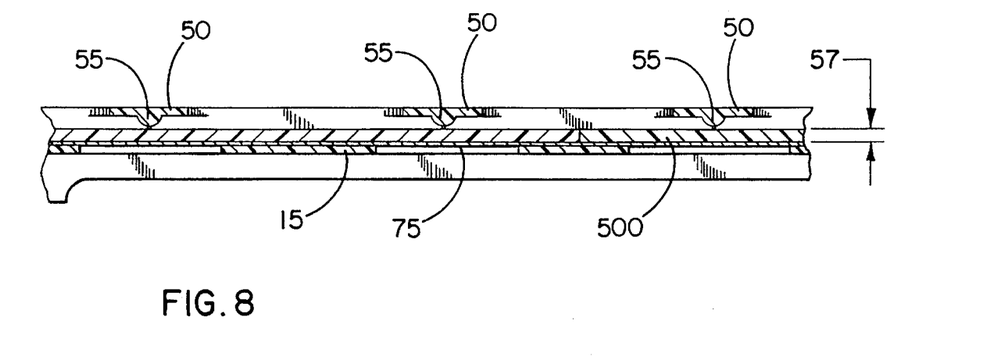
FIG. 8 is a partial cross-sectional view taken along line 8—8 of the stencil holder of FIG. 5 with four stencils mounted on the stencil holder over a sheet of paper.

Referring to FIGS. 6 and 7, the stencils 500, having length 502, width 504, and height 506 as previously described, comprise a stencil body 510 having tracing holes 520. The tracing holes 520 are voids in the stencil body 510 through which the user may insert a marking instrument. The tracing holes may be cut in a great variety of patterns, so that the user may trace a variety of images onto the underlying writing surface. Where the marking instrument to be employed is a crayon, the tracing holes should be of sufficient dimension to allow the passage of the tip of the crayon.

Preferably, the stencil set contains more than four stencils, so that the user may have a large number of images to choose from when using the stencil set. More preferably, the number of stencils included with the stencil set is greater than ten.

The materials used to make the stencil holder and stencils are not subject to any particular limitation. Wood, metal, and plastic, for example, may be used. The stencil holder of the present invention is preferably made of plastic, for example, polypropylene, polyethylene, or polystyrene. Polystyrene is preferred. The stencil holder and stencils may be made by any suitable technique, such as, for example, injection molding from a mold. When injection molding is used to form the stencil holder, the stencil holder so formed will be constructed of a single piece of plastic, thus eliminating the need for adhesives, screws, and the like. If the platform is itself to be a writing surface, such as a chalkboard, the stencil holder can be made by injection molding, as described above, and the writing surface may be attached to the stencil holder by any suitable method.

To use the stencil set of the present invention, the user places a piece of paper on the platform, if the writing surface to be used is a piece of paper. Next, the user selects the stencils to be traced. One skilled in the art will immediately appreciate that, when four stencils are mounted in a fixed position with respect to the platform, as illustrated in FIG. 5, the user is able to trace the images from four stencils onto the writing surface without needing to remove and replace the stencils. Fewer than four stencils may be mounted in a fixed position with respect to the platform by placing the stencils on the stencil holder as previously described. However, to eliminate movement of the stencils when the stencil holder is jarred, it is preferred to use four stencils, as illustrated by FIG. 5.

The user may create a great variety of tracings, even with just a few stencils. For example, if the stencil set includes four stencils, the user may mount the four stencils in twenty-four different permutations onto the platform. If the stencil set contains sixteen stencils, the user may mount the stencils in 43,680 permutations of four stencils. This vast number of permutations allows the user to experiment with the arrangement of stencils, and will prevent the user from becoming bored. In a preferred embodiment, the stencil may be reversed so that the mirror image of the pattern defined by the tracing holes 520 may be traced by the child. This raises the total number of permutations to almost 700,000 in the case of a stencil set containing sixteen stencils.

If the user has sufficient dexterity to hold the stencil in place without the aid of the retaining wall, the tabs 50, or other means for securing the stencil in place, the user may place one or more stencils onto the platform in a manner such that the stencil is not detachably secured to the stencil holder. For example, the user may place the stencil in the center of the stencil holder, or may rotate the stencil such that the image created is rotated with respect to the edges of the stencil holder. This allows an older child or adult to maintain interest in the stencil holder.

When the stencil holder is in use, the user may place the stencils in the storage well. This allows the user to see one or more stencils that are located within the storage well. Thus, the user may select a new stencil for use at any time.

While particular embodiments of the invention have been shown, it will of course be understood that the invention in not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. A stencil holder comprising: (a) a platform adaptable to include a writing surface; and (b) securing means associated with said platform, wherein said securing means are adapted to detachably secure at least two stencils to said platform, said securing means comprising a retaining wall extending in a direction generally perpendicular to the platform, wherein said securing means are adapted to allow a user to select any one of said stencils to be removed from said platform while allowing a second stencil to remain secured to said platform, wherein the stencil holder further comprises at least one covering tab attached to said retaining wall.

2. A stencil holder according to claim 1, wherein said securing means are adapted to detachably secure at least four stencils to the platform.

3. A stencil holder according to claim 1, wherein said wall contains a passage, wherein said passage is contiguous with a notch in said platform, thereby forming a lifting slot in said stencil holder.

4. A stencil holder according to claim 3, wherein said stencil holder includes at least two lifting slots.

5. A stencil holder according to claim 1 wherein said covering tab contains a nub.

6. A stencil holder according to claim 5, wherein said nub has a generally hemispherical shape.

7. A stencil holder according to claim 1, wherein said stencil holder further comprises a plurality of covering tabs attached to said retaining wall, wherein each of said covering tabs contains a nub.

8. A stencil holder according to claim 1, wherein said retaining wall is suitably dimensioned to detachably secure four adjacent stencils to the platform.

9. A stencil holder according to claim 8, wherein the length of said platform is equal to two times the length of one of said stencils, wherein the width of said platform is equal to two times the width of one of said stencils, wherein said stencils may be mounted onto said stencil holder such that said platform is completely covered by said stencils.

10. A stencil holder according to claim 1, further comprising means for storage of the stencils associated with said platform.

11. A stencil holder according to claim 10, wherein said means for storage comprise a storage well.

12. A stencil holder according to claim 1, wherein said platform further includes a writing surface, wherein said writing surface is paper.

13. A stencil holder according to claim 12, wherein said platform has dimensions comprising a length and a width, wherein said paper is a sheet of paper having dimensions that are equal to the dimensions of said platform.

14. A stencil holder according to claim 1, wherein said platform further includes a writing surface, wherein said writing surface is a chalkboard.

15. A stencil holder according to claim 1, wherein said platform further includes a writing surface, wherein said writing surface is a whiteboard.

16. A stencil holder according to claim 1, wherein said platform further includes a writing surface, wherein said writing surface is a wipeable crayon surface.

17. A stencil holder according to claim 1, wherein said platform is elevated with respect to a surface on which the user places the stencil holder.

18. A stencil holder according to claim 1, wherein said platform has an upper surface and a lower surface, wherein said platform is elevated by a skirt extending from said lower surface.

19. A stencil holder according to claim 18, further comprising a support extending from said lower surface.

20. A stencil holder according to claim 19, wherein said platform is capable of bearing a load of 50 pounds applied to said upper surface.

21. A stencil set comprising a stencil holder and at least two stencils, said stencil holder comprising (a) a platform adaptable to include a writing surface; and (b) securing means associated with said platform, wherein said securing means are adapted to detachably secure at least two stencils to said platform, said securing means comprising a retaining wall extending in a direction generally perpendicular to the platform, wherein said securing means are adapted to allow a user to select any one of said stencils to be removed from said platform while allowing a second stencil to remain secured to said platform, wherein the stencil holder further comprises at least one covering tab attached to said retaining wall.

22. A stencil set according to claim 21, wherein said covering tab extends over a portion of a stencil.

23. A stencil set according to claim 22 wherein said covering tab includes a nub, wherein said nub engages a stencil.

24. A stencil set according to claim 21, wherein the set comprises at least four stencils.

25. A stencil set according to claim 21, further comprising a writing instrument.

26. A stencil set according to claim 25, wherein said writing instrument is a pencil.

27. A stencil set according to claim 25, wherein said writing instrument is a crayon.

28. A stencil set according to claim 25, wherein said writing instrument is a marker.

29. A stencil set according to claim 25, wherein said writing instrument is a piece of chalk.

30. A method of making an image on a piece of paper, said method comprising:

providing a stencil set, said stencil set comprising a stencil holder and at least two stencils, said stencil holder comprising: (a) a platform adaptable to include a writing surface; and (b) securing means associated with said platform, wherein said securing means are adapted to detachably secure at least two stencils to said platform, said securing means comprising a retaining wall extending in a direction generally perpendicular to the platform, wherein said securing means are adapted to allow a user to select any one of said stencils to be removed from said platform while allowing a second stencil to remain secured to said platform, wherein the stencil holder further comprises at least one covering tab attached to said retaining wall;

securing at least two stencils to said platform by placing said stencils in a position such that said securing means secures said stencils; and making a stencil tracing using said stencil set.

31. A method according to claim 30, wherein said step of securing stencils to said platform comprises securing four stencils to said platform.

32. A method according to claim 30, wherein said step of making a stencil tracing is performed with a crayon.

33. A method according to claim 30, wherein said step of making a stencil tracing is performed with a whiteboard marker.

34. A method according to claim 30, wherein said step of making a stencil tracing is performed with a pencil.

35. A method according to claim 30, wherein said step of making a stencil tracing is performed with a piece of chalk.

36. A method according to claim 30, wherein said stencil holder further comprises means for storage of said stencils associated with said platform, wherein said method further comprises the steps of:

removing said stencils from said platform; and storing said stencils in said means for storage of said stencils.

37. A stencil holder comprising: (a) a platform adaptable to include a writing surface; and (b) securing means associated with said platform, wherein said securing means are adapted to detachably secure at least one stencil to said platform, said securing means comprising a retaining wall extending in a direction generally perpendicular to the platform, wherein said wall contains a passage, wherein said passage is contiguous with a notch in said platform, thereby forming a lifting slot in said stencil holder.

38. A stencil holder according to claim 37, wherein said stencil holder includes at least two lifting slots.

39. A stencil holder according to claim 38, wherein said securing means are adapted to detachably secure at least two stencils to said platform, wherein said securing means are adapted to allow a user to select one stencil to be removed from said platform while allowing a second stencil to remain secured to said platform.

40. A stencil holder according to claim 37, wherein said securing means are adapted to detachably secure at least two stencils to said platform, wherein said securing means are adapted to allow a user to select one stencil to be removed from said platform while allowing a second stencil to remain secured to said platform.

41. A stencil holder comprising: (a) a platform adaptable to include a writing surface; and (b) securing means associated with said platform, wherein said securing means are adapted to detachably secure at least one stencil to said platform, said securing means comprising a retaining wall extending in a direction generally perpendicular to the platform, wherein the stencil holder further comprises at least one covering tab attached to said retaining wall, wherein said covering tab contains a nub.

42. A stencil holder according to claim 41, wherein said nub has a generally hemispherical shape.

43. A stencil holder according to claim 42, wherein said securing means are adapted to detachably secure at least two stencils to said platform, wherein said securing means are adapted to allow a user to select one stencil to be removed from said platform while allowing a second stencil to remain secured to said platform.

44. A stencil holder according to claim 41, wherein said nub is providing for engaging a stencil.

45. A stencil holder according to claim 41, wherein said securing means are adapted to detachably secure at least two stencils to said platform, wherein said securing means are adapted to allow a user to select one stencil to be removed from said platform while allowing a second stencil to remain secured to said platform.

46. A stencil holder comprising: (a) a platform adaptable to include a writing surface; and (b) securing means associated with said platform, wherein said securing means are adapted to detachably secure at least one stencil to said platform, said securing means comprising a retaining wall extending in a direction generally perpendicular to the platform, wherein said stencil holder further comprises a plurality of covering tabs attached to said retaining wall, wherein each of said covering tabs contains a nub.

47. A stencil holder according to claim 46, wherein said securing means are adapted to detachably secure at least two stencils to said platform, wherein said securing means are adapted to allow a user to select one stencil to be removed from said platform while allowing a second stencil to remain secured to said platform.

48. A stencil holder comprising: (a) a platform adaptable to include a writing surface; and (b) securing means associated with said platform, wherein said securing means are adapted to detachably secure at least one stencil to said platform, wherein said platform further includes a writing surface, wherein said writing surface is a whiteboard.

49. A stencil holder according to claim 48, wherein said securing means are adapted to detachably secure at least two stencils to said platform, wherein said securing means are adapted to allow a user to select one stencil to be removed from said platform while allowing a second stencil to remain secured to said platform.

50. A stencil holder according to claim 48, wherein said securing means are adapted to detachably secure at least four stencils to the platform.

51. A stencil holder according to claim 48, wherein the stencil holder further comprises at least one covering tab attached to said retaining wall.

52. A stencil holder according to claim 48, further comprising means for storage of the stencils associated with said platform.

53. A stencil holder comprising: (a) a platform adaptable to include a writing surface; and (b) securing means associated with said platform, wherein said securing means are adapted to detachably secure at least one stencil to said platform, wherein said platform further includes a writing surface, wherein said writing surface is a wipeable crayon surface.

54. A stencil holder according to claim 53, wherein said securing means are adapted to detachably secure at least two stencils to said platform, wherein said securing means are adapted to allow a user to select one stencil to be removed from said platform while allowing a second stencil to remain secured to said platform.

55. A stencil holder according to claim 53, wherein said securing means are adapted to detachably secure at least four stencils to the platform.

56. A stencil holder according to claim 53, wherein the stencil holder further comprises at least one covering tab attached to said retaining wall.

57. A stencil holder according to claim 53, further comprising means for storage of the stencils associated with said platform.

58. A stencil holder comprising: (a) a platform adaptable to include a writing surface; and (b) securing means associated with said platform, wherein said securing means are adapted to detachably secure at least two stencils to said platform, said securing means comprising a retaining wall extending in a direction generally perpendicular to the platform, wherein said securing means are adapted to allow a user to select one stencil to be removed from said platform while allowing a second stencil to remain secured to said platform, wherein said stencil holder further comprises means for storage of the stencils associated with said platform.

59. A stencil holder according to claim 58, wherein said means for storage comprise a storage well.

60. A stencil holder according to claim 58, wherein said securing means are adapted to detachably secure at least four stencils to the platform.

61. A stencil holder according to claim 58, wherein said wall contains a passage, wherein said passage is contiguous with a notch in said platform, thereby forming a lifting slot in said stencil holder.

62. A stencil holder according to claim 61, wherein said stencil holder includes at least two lifting slots.

63. A stencil holder according to claim 58, wherein the stencil holder further comprises at least one covering tab attached to said retaining wall.

64. A stencil holder according to claim 58, wherein said covering tab contains a nub.

65. A stencil holder according to claim 64, wherein said nub has a generally hemispherical shape.

66. A stencil holder according to claim 58, wherein said stencil holder further comprises a plurality of covering tabs attached to said retaining wall, wherein each of said covering tabs contains a nub.

67. A stencil holder according to claim 58, wherein said retaining wall is suitably dimensioned to detachably secure four adjacent stencils to the platform.

68. A stencil holder according to claim 67, wherein the length of said platform is equal to two times the length of one of said stencils, wherein the width of said platform is equal to two times the width of one of said stencils, wherein said stencils may be mounted onto said stencil holder such that said platform is completely covered by said stencils.

69. A stencil holder according to claim 58, wherein said writing surface is paper.

70. A stencil holder according to claim 69, wherein said platform has dimensions comprising a length and a width, wherein said paper is a sheet of paper having dimensions that are equal to the dimensions of said platform.

71. A stencil holder according to claim 58, wherein said platform further includes a writing surface, wherein said writing surface is a chalkboard.

72. A stencil holder according to claim 58, wherein said platform further includes a writing surface, wherein said writing surface is a whiteboard.

73. A stencil holder according to claim 58, wherein said platform further includes a writing surface, wherein said writing surface is a wipeable crayon surface.

74. A stencil holder according to claim 58, wherein said platform is elevated with respect to a surface on which the user places the stencil holder.

75. A stencil holder according to claim 74, further comprising a support extending from said lower surface.

76. A stencil holder according to claim 75, wherein said platform is capable of bearing a load of 50 pounds applied to said upper surface.

77. A stencil holder according to claim 58, wherein said platform has an upper surface and a lower surface, wherein said platform is elevated by a skirt extending from said lower surface.

78. A stencil set comprising a stencil holder and at least two stencils, said stencil holder comprising: (a) a platform adaptable to include a writing surface; and (b) securing means associated with said platform, wherein said securing means are adapted to detachably secure at least two stencils to said platform, said securing means comprising a retaining wall extending in a direction generally perpendicular to the platform, wherein said securing means are adapted to allow a user to select one stencil to be removed from said platform while allowing a second stencil to remain secured to said platform, wherein said stencil holder further includes means for storage of said stencils associated with said platform.

79. A stencil set according to claim 78, wherein the set comprises at least four stencils.

80. A stencil set according to claim 78, further comprising a writing instrument.

81. A stencil set according to claim 80, wherein said writing instrument is a pencil.

82. A stencil set according to claim 80, wherein said writing instrument is a crayon.

83. A stencil set according to claim 80, wherein said writing instrument is a marker.

84. A stencil set according to claim 80, wherein said writing instrument is a piece of chalk.

* * * * *

UNITED STATES PATENT AND TRADEMARK OFFICE
CERTIFICATE OF CORRECTION

PATENT NO. : 5,533,900
DATED : July 9, 1996
INVENTOR(S) : Robert S. Volk

It is certified that error appears in the above-indentified patent and that said Letters Patent is hereby corrected as shown below:

Col. 5, line 49, "with Crayons," should read --with crayons,--

Signed and Sealed this

Twenty-ninth Day of October 1996

Attest:

BRUCE LEHMAN

Attesting Officer

Commissioner of Patents and Trademarks